(12) United States Patent
Yoshikawa

(10) Patent No.: US 7,664,340 B2
(45) Date of Patent: Feb. 16, 2010

(54) IMAGING DEVICE

(75) Inventor: Koichi Yoshikawa, Kanagawa (JP)

(73) Assignee: Sony Corporation, Tokyo (JP)

(*) Notice: Subject to any disclaimer, the term of this patent is extended or adjusted under 35 U.S.C. 154(b) by 666 days.

(21) Appl. No.: 11/545,698

(22) Filed: Oct. 10, 2006

(65) Prior Publication Data

US 2007/0091195 A1 Apr. 26, 2007

(30) Foreign Application Priority Data

Oct. 11, 2005 (JP) ............................ P2005-296529

(51) Int. Cl.
- G06K 9/36 (2006.01)
- G06K 9/34 (2006.01)
- H04N 7/00 (2006.01)
- H04N 5/225 (2006.01)
- G02B 27/10 (2006.01)
- G02B 17/00 (2006.01)

(52) U.S. Cl. .................... 382/284; 382/173; 348/218.1; 348/36; 359/618; 359/726

(58) Field of Classification Search ................ 382/284; 359/618; 348/218.1
See application file for complete search history.

(56) References Cited

U.S. PATENT DOCUMENTS 7,515,177 B2 * 4/2009 Yoshikawa ............... 348/218.1

FOREIGN PATENT DOCUMENTS

| JP | 2003 162018 | 6/2003 |
| JP | 2004-184862 | 7/2004 |

* cited by examiner

Primary Examiner—Brian P Werner
Assistant Examiner—Jose M Torres
(74) Attorney, Agent, or Firm—Frommer Lawrence & Haug LLP; William S. Frommer

(57) ABSTRACT

An imaging device includes imagers each having an imaging element. An NP point is located downstream of the imaging element, and all NP points are collectively located within a predetermined radius region centered on one of the NP points. A lens closest to the object is cut along a plane not including the optical axis, and a>H is satisfied, where H is a distance from the optical axis to a center portion of an overlapping region with the adjacent imager when the imaging element is scanned from the optical axis toward the optical axis of the adjacent imager, and a is a distance from the optical axis to a position at which an illuminance ratio does not vary even if an aperture stop state is shifted, although the position is located in a region in which the illuminance ratio decreases as the distance from the optical axis increases.

5 Claims, 12 Drawing Sheets

IMAGING DEVICE

CROSS REFERENCES TO RELATED APPLICATIONS

The present invention contains subject matter related to Japanese Patent Application JP 2005-296529 filed in the Japanese Patent Office on Oct. 11, 2005, the entire contents of which are incorporated herein by reference.

BACKGROUND OF THE INVENTION

1. Field of the Invention

The present invention relates to an imaging device capable of picking up images in a wide range extending over 120 degrees or more in a forward direction, over the all sky (all directions), or the like.

2. Description of the Related Art

There is developed a camera apparatus having a plurality of video cameras in a casing to pick up an image extending over all directions or all around the camera apparatus at the same time.

The camera apparatus having the above-described configuration generally has a problem of parallax, and to restrain this, there is suggested an optical system which restrains the parallax without using a mirror (for example, see Japanese Unexamined Patent Application Publication No. 2003-162018).

The optical system without the mirror has advantages such that an apparatus may be entirely reduced in size because a capacity for the mirror is not necessary, and easily handled as an optical system only including typical lenses.

SUMMARY OF THE INVENTION

However, it is basically inevitable that an amount of light reaching an imaging element decreases at the joint of images for restraining the parallax.

If the amount of light decreases at the joint of the images, the joint may appear as a dark band portion, causing irregularity at the joint.

The amount of parallax and the amount of light at the joint of the images are contrary to each other. If the amount of parallax decreases, the amount of light gradually decreases. Accordingly, image quality at the joint of the images may be deteriorated.

Therefore, according to the present invention, it is desirable to provide an imaging device capable of joining images without irregularity at the joint of images and providing images in a wide range using a plurality of imagers.

An imaging device according to an embodiment of the present invention includes: a plurality of imagers each of which picks up an image of each of a plurality of sub-objects obtained by dividing an object in a wide range; and a processing unit for joining the images to form a composite image in accordance with image information output from the imagers and input to the processing unit. Each imager includes at least one lens having an aperture stop, and an imaging element for sensing a ray passing through the at least one lens. When a chief ray located in a Gauss region is selected from chief rays passing through the center of the aperture stop of the at least one lens of each imager, and a point at which an optical axis of the at least one lens of each imager intersects with an extended line component of the selected chief ray located in an object space is defied as a NP point, in terms of each imager, the NP point is located downstream of the imaging element of each imager, and in terms of the plurality of imagers, the NP points are collectively located within a predetermined radius region centered on one of the NP points. In each imager, a lens which is included in the at least one lens and disposed closest to the object is cut along a plane not including the optical axis of each imager, and a>H is satisfied, where H is a distance from the optical axis of one of the plurality of imagers to a center portion of an overlapping region, in which the image of the one imager is overlapped with that of the adjacent imager when the imaging element of the one imager is scanned from the optical axis toward the optical axis of the adjacent imager, and a is a distance from the optical axis of the one imager to a position at which an illuminance ratio with respect to a maximum illuminance in the scanning direction does not vary even if the aperture stop is shifted from an open aperture state to a closed aperture state, although the position is located in a region in which the illuminance ratio with respect to the maximum illuminance in the scanning direction decreases as the distance from the optical axis of the one imager increases.

With the configuration of the above-described imaging device according to the embodiment of the present invention, since the NP point is located downstream of the imaging element in each imager, an optical system such as a lens of the imager will not interfere with an optical path of other imager. In addition, since the NP points of the plurality of imagers are collectively located in the predetermined radius region centered on the one of the NP points, the parallax generated between the images of these imagers may be restrained, and thus, almost no parallax is generated.

Since the plurality of imagers pick up the images of the plurality of sub-objects obtained by dividing the object in the wide range, the object in the wide range can be picked up while almost no parallax is generated.

In addition, the lens disposed closest to the object is cut along the plane not including the optical axis. Accordingly, these adjacent imagers having the adjacent image regions can be joined together at the cutting plane, thereby easily allowing the NP points to be collectively located within the predetermined radius region while the imagers are joined.

Further, since a>H is satisfied, where H is the distance from the optical axis to the center portion of the overlapping region, in which the image is overlapped with that of the adjacent imager when the imaging element is scanned from the optical axis toward the optical axis of the adjacent imager, and a is the distance from the optical axis to the position at which the illuminance ratio with respect to the maximum illuminance in the scanning direction does not vary even if the aperture stop is shifted from the open aperture state to the closed aperture state, although the position is located in the region in which the illuminance ratio with respect to the maximum illuminance in the scanning direction decreases as the distance from the optical axis increases. Accordingly, a sufficient amount of light can be provided in any aperture state from the open aperture state to the closed aperture state, in the range of from the optical axis to the center portion of the overlapping region.

At the position at which the distance from the optical axis is a, the illuminance ratio with respect to the maximum illuminance in the scanning direction does not vary even if the aperture stop is shifted from the open aperture state to the closed aperture state although the position is located in the region in which the illuminance ratio with respect to the maximum illuminance in the scanning direction decreases as the distance from the optical axis increases. Accordingly, a certain amount of light may be provided, and the center portion of the overlapping region is closer to the optical axis than the position when a>H is satisfied.

According to the above-described configuration, the sufficient amount of light can be provided in any aperture state of from the open aperture state to the closed aperture state in the range from the optical axis to the center portion of the overlapping region in the imaging element. Therefore, the sufficient amount of light can be provided even at the joint (overlapping region) of the images when the images picked up by the imaging elements of these adjacent imagers are joined together.

Owing to this, the configuration can prevent insufficiency in the amount of light at the joint of the images, and provide the images without the irregularity at the joint of the images, thereby providing the images with high image quality in any aperture state.

In addition, the configuration can pick up the images of the object in the wide range while almost no parallax is generated.

Therefore, the configuration according to the embodiment of the present invention can pick up the images in the wide range, for instance, extending over 120 degrees or more in a forward direction, or over all directions, with high image quality.

In addition, since the image regions are respectively assigned to the plurality of lenses with cameras, the images with high resolution can be picked up over the wide range by picking up the images with the cameras offering high resolution.

DESCRIPTION OF THE PREFERRED EMBODIMENTS

General description on the present invention will be given prior to specific embodiments of the present invention.

Figure 1:
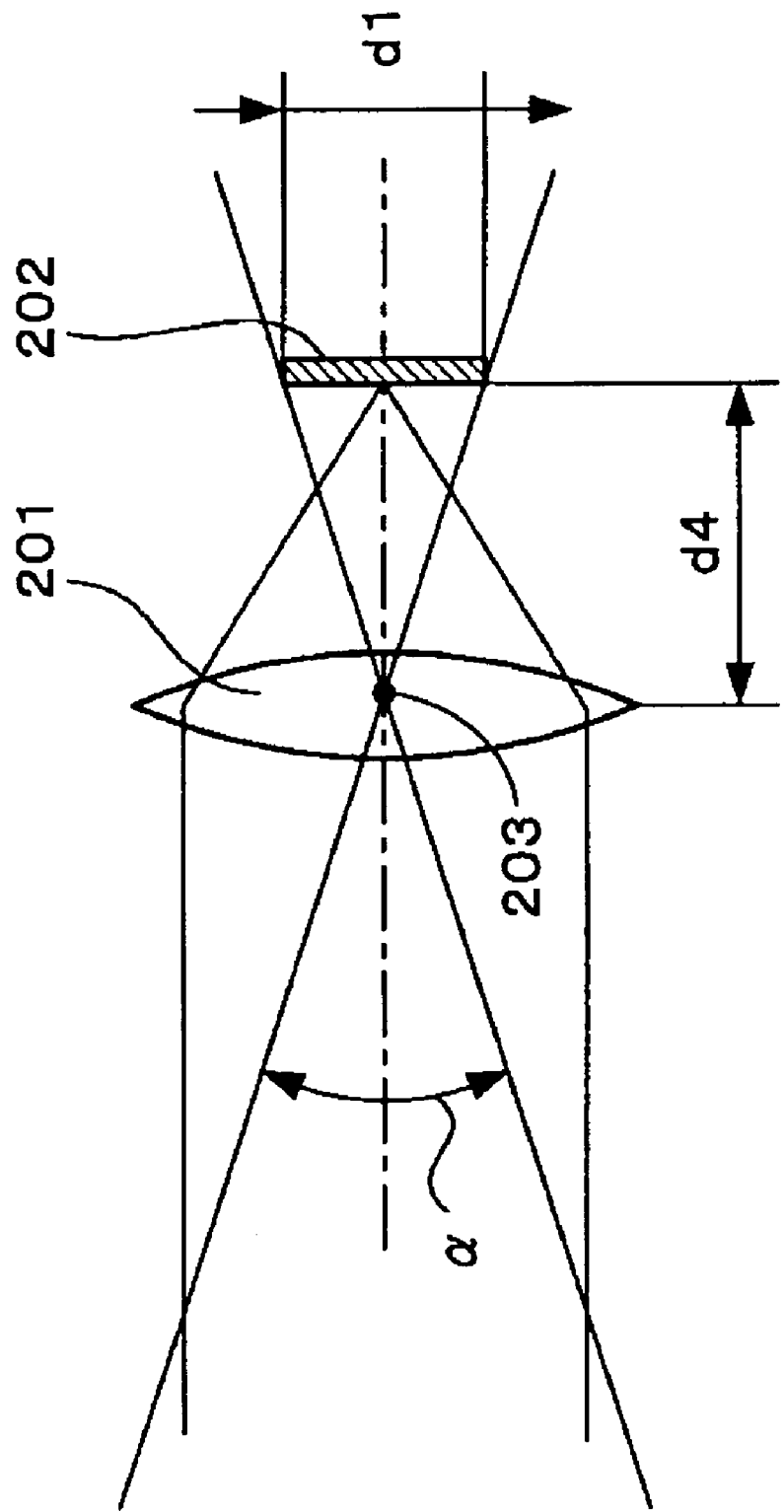
FIG. 1 is an illustration for describing the fundamentals of an imaging device according to a general embodiment of the present invention.

A lens system used for a video camera or the like is designed to include a plurality of lenses combined for minimizing aberrations such as chromatic aberration, curvature of field, and flare. The lens system may be theoretically formed as a thin convex lens 201 as shown in FIG. 1. An imaging device for a video camera using a solid-state imaging element, such as a CCD or MOS, or an imaging element 202 which is used for a film used for a silver salt camera, is disposed at a focal position of the convex lens 201.

In the imaging device having the general configuration, assuming that refraction due to the convex lens 201 is not present, an angle of view α is defined by a diameter d1 which is substantially a diameter of the imaging element 202, and a distance d4 (focal length) between the convex lens 201 and the imaging element 202, and may be expressed by an expression of: $\tan(\alpha/2) = (d1/2)/(d4)$.

Therefore, to image an object using the camera, if an image is picked up while the camera is turned around a later-described NP point (non parallax point) 203 which is located inside and at the center of the convex lens 201, parallax is not generated among a plurality of images thus obtained.

Figure 2:
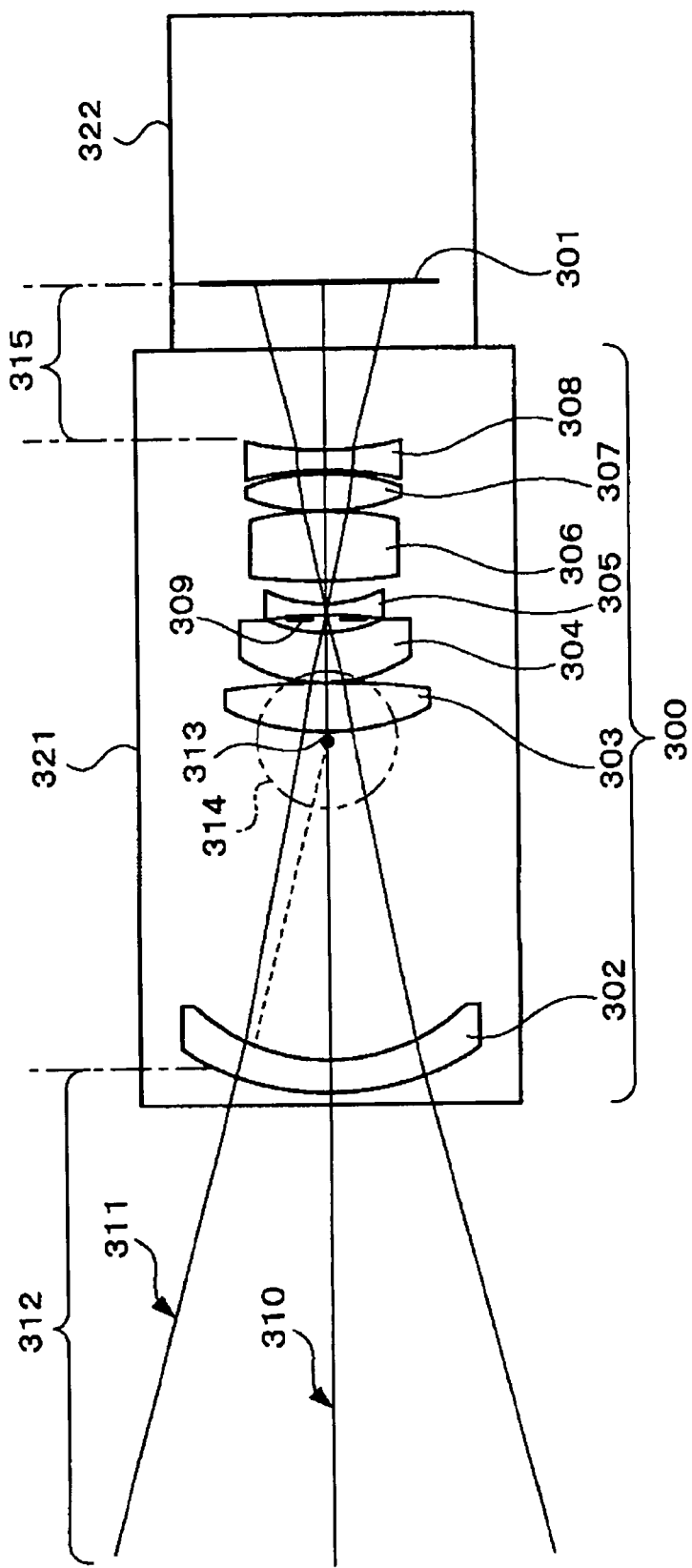
FIG. 2 is an illustration for describing the fundamentals of the imaging device according to the general embodiment of the present invention.

The NP point is detected according to many experiments performed by the inventors of the present application to decrease the parallax which may be generated among the images when the plurality of images are joined together, based on the fundamentals of an optical system. As shown in FIG. 2, the NP point will be described in a case where light reflected from an object passes through an equivalent convex lens 300, and then focused into an image at an imager 301.

The equivalent convex lens 300 includes a plurality of lenses 302 to 308, and an aperture stop 309 is disposed between the lenses 304 and 305.

Reference numeral 321 shown in FIG. 2 denotes a camera cone, and 322 denotes a camera.

Then, a chief ray 311 passing through a region of the aperture stop 309 located closest to an optical axis 310, namely, the chief ray 311 passing through a Gauss region in which the aberration is the least, is selected from chief rays passing through the aperture stop 309.

A linear portion of the chief ray 311 located in an object space 312 is extended, and a point at which the extended linear portion intersects with the optical axis 310 is determined as a NP point (non parallax point) 313.

Upon verifying the presence of the NP point 313, the NP point 313 is applied to a case where a plurality of cameras are used for picking up images at the same time instead of using the one turning camera.

In the one convex lens 201 shown in FIG. 1, since the NP point 203 is located at the restricted position, it is theoretically difficult to arrange the plurality of cameras to share the one NP point 203.

In contrast, when a plurality of lenses are combined as the equivalent convex lens 300 shown in FIG. 2, a NP point may be located at an arbitrary position substantially on an extended line of the optical axis 310.

When the plurality of cameras are used for picking up images at the same time, to allow respective NP points to coincide with each other, there may be a configuration in which the NP point 313 is located in air between the lenses (302 and 303) as shown in FIG. 2, or a configuration in which a mirror (not shown) is disposed upstream of the lenses, so that light is reflected by the mirror, acquired by a camera, and allows positions of virtual images of NP points of the cameras to coincide with each other.

However, with these configurations, a part of the camera having an imaging element and a signal-processing circuit may physically interfere with an image range of other camera. Accordingly, an image at the interference part may not be picked up.

According to the present invention, a NP point is located downstream of an imaging element in each camera. In addition, all NP points of the cameras are located within a predetermined radius region (spherical region).

If the NP point is located downstream of the imaging element, an optical system such as a lens of an imager would not interfere with an optical path of other imager.

In addition, if all NP points of the cameras are located in the predetermined radius region (spherical region), parallax generated between the images of the adjacent cameras may be restrained.

Preferably, the predetermined radius region may be a region within a radius of 20 mm.

In order to locate the NP point downstream of the imaging element as described above, a plurality of lenses may be combined to form an optical system of telephoto type.

In order to form the optical system of the telephoto type and locate the NP point downstream of the imaging element, for instance, a lens functioning as a convex lens (convergence function) may be disposed at an object space side (object side), and a lens functioning as a concave lens (divergence function) may be disposed at an image space side (imaging element side).

In addition, in each imager according to the embodiment of the present invention, a lens disposed closest to the object is cut along a plane not including the optical axis.

With this configuration, the imagers having adjacent image regions may be joined at the cutting planes of the imagers. This allows the NP points to be easily located within the predetermined radius region as described above while the imagers are joined together.

Figure 14:
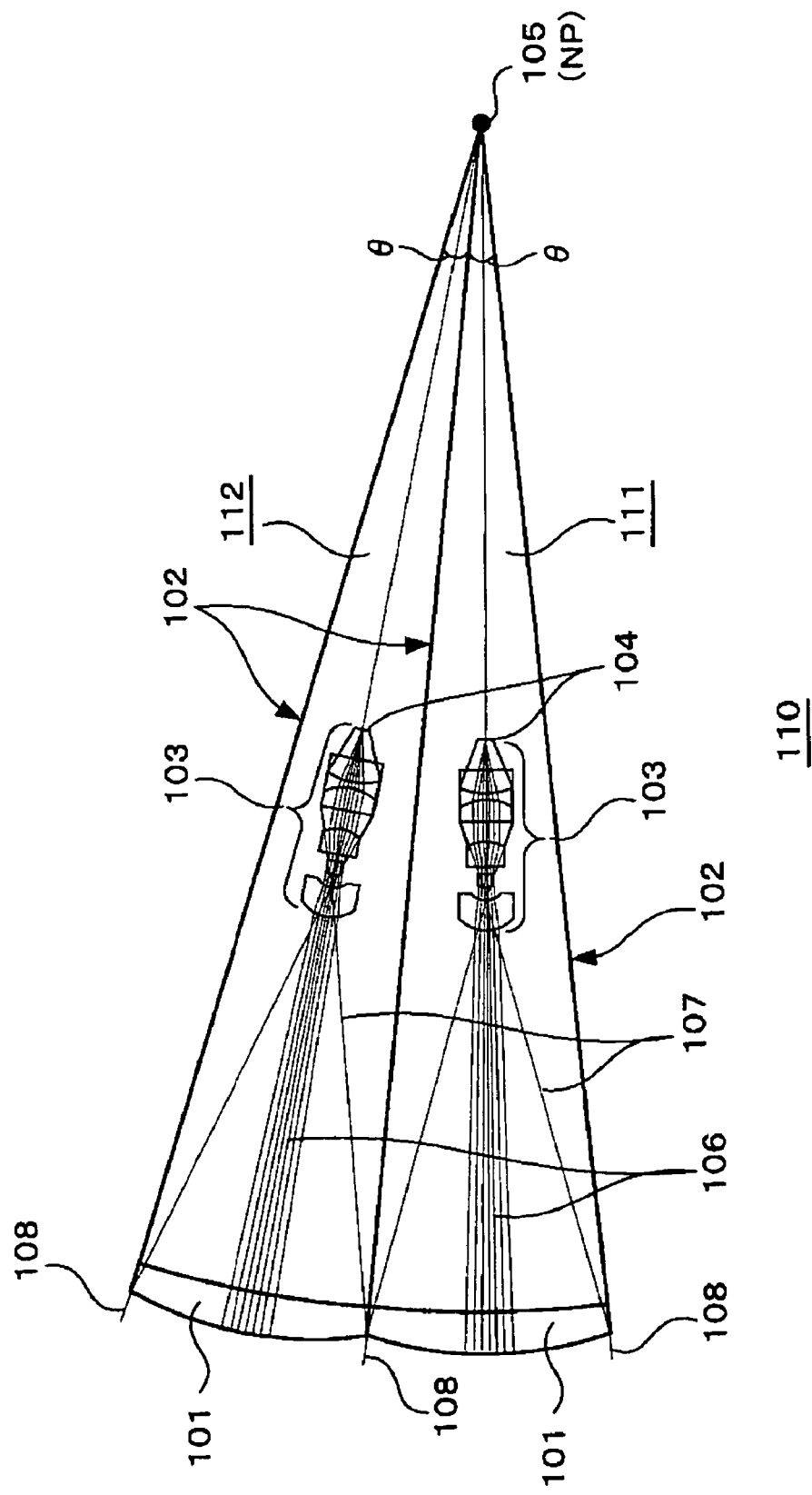
FIG. 14 is a schematic illustration showing a configuration of an imaging device according to a comparative example relative to the present invention.

Now, an imaging device according to a comparative example relative to the present invention will be shown in FIG. 14.

An imaging device 110 shown in FIG. 14 is formed by joining two imagers (cameras) 111 and 112. The imaging device 110 provides a composite image formed by joining images respectively picked up by the two imagers (cameras) 111 and 112. FIG. 14 is a cross sectional view taken along a plane connecting optical axes of lenses of the two adjacent cameras 111 and 112.

The cameras 111 and 112 each include a front lens 101, a casing 102, a lens group 103, and an imaging element 104. The casing 102 has a sector-like cross section with a vertex angle θ, and a vertex 105 substantially coincides with the above-mentioned NP point. In addition, in the two cameras 111 and 112, the vertexes 105 of the casings 102 coincide with each other, that is, the NP point is common.

FIG. 14 also shows an optical path when the F-number is 2.0, which is a F-number corresponding to an open aperture state.

Figure 15:
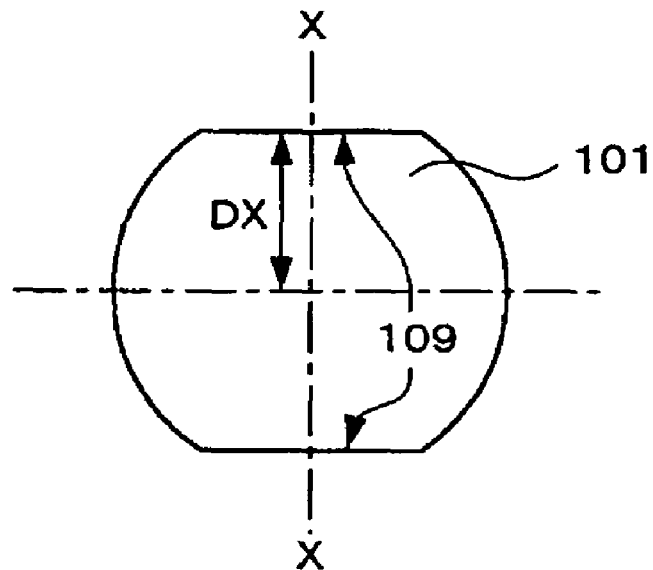
FIG. 15 is a plan view showing a front lens shown in FIG. 14 viewed from an object in an optical axis direction.

In addition, FIG. 15 shows a plan view showing the front lens 101 shown in FIG. 14 viewed from an object in an optical axis direction. A line X-X shown in FIG. 15 is a plane (cross section shown in FIG. 14) connecting the optical axes of the lenses of the two adjacent cameras 111 and 112.

For allowing the NP point of the camera 111 to substantially coincide with that of the camera 112 at the vertex 105 of the sector-like casing, a circular lens is cut along cutting planes including lines 109 (planes not including the optical axis of the lens) to form the front lens 101 as shown in FIG. 15.

Accordingly, rays reaching the outside of the lines 109 are not received by the front lens 101, and as shown in FIG. 14, the number of rays 107 and 108 reaching an edge of the imaging element 104 becomes smaller than that of rays 106 reaching the center of the imaging element 104.

Figure 16:
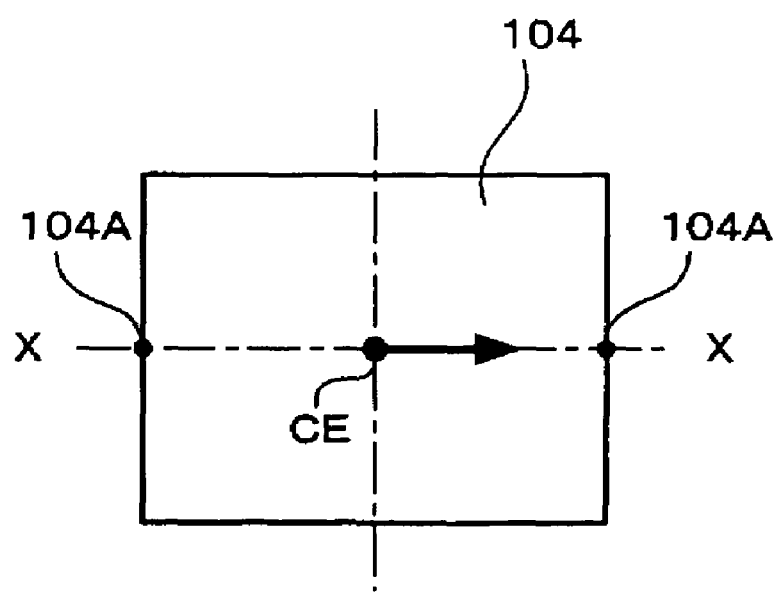
FIG. 16 is a plan view showing an effective pixel region of an imaging element shown in FIG. 14.

FIG. 16 shows a plan view showing an effective pixel region of the imaging element 104. Each of points 104A in FIG. 16 is an intersection point at which the plane X-X connecting the optical axes of the lenses of the adjacent cameras 111 and 112 intersects with an edge of the effective pixel region.

Figure 17:
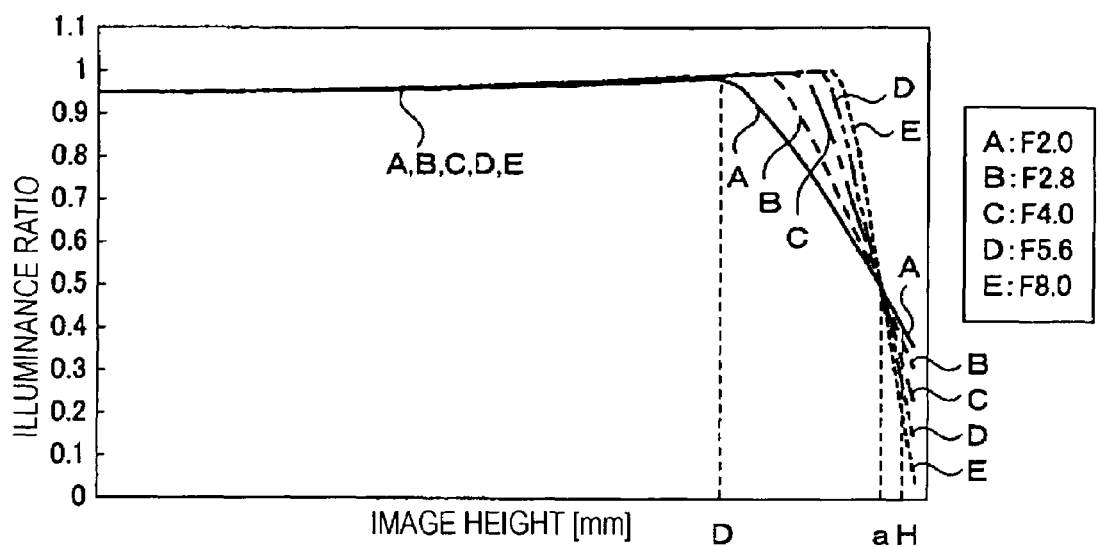
FIG. 17 is an illustration showing variation in illuminance ratios when the imaging element shown in FIG. 16 is scanned in an arrow direction from the center thereof.

FIG. 17 is an illustration showing variation in illuminance ratios when the imaging element 104 shown in FIG. 16 is scanned in an arrow direction from a center CE (disposed on the optical axis of the front lens 101 and the lens group 103) thereof, i.e., in a direction toward an optical axis of the adjacent camera. The horizontal axis of FIG. 17 represents a distance (image height) from the center CE of the imaging element 104, and the vertical axis represents the illuminance ratio when assuming that the maximum illuminance in the scanning direction is 1. Curves A, B, C, D, and E represent variations in the illuminance ratios in accordance with F-numbers, ranged from 2.0 (open aperture state) to 8.0.

As shown in FIG. 17, since the rays reaching the outside of the lines 109 are not received by the front lens 101, the illuminance ratio decreases when the F-number is 2.0 (curve A) in a region in which the image height (distance from the center CE) is D or more. When the F-number increases, the point at which the decrease in the illuminance ratio is started is away from the center CE (image height 0), however, the illuminance ratio rapidly decreases.

Figure 18:
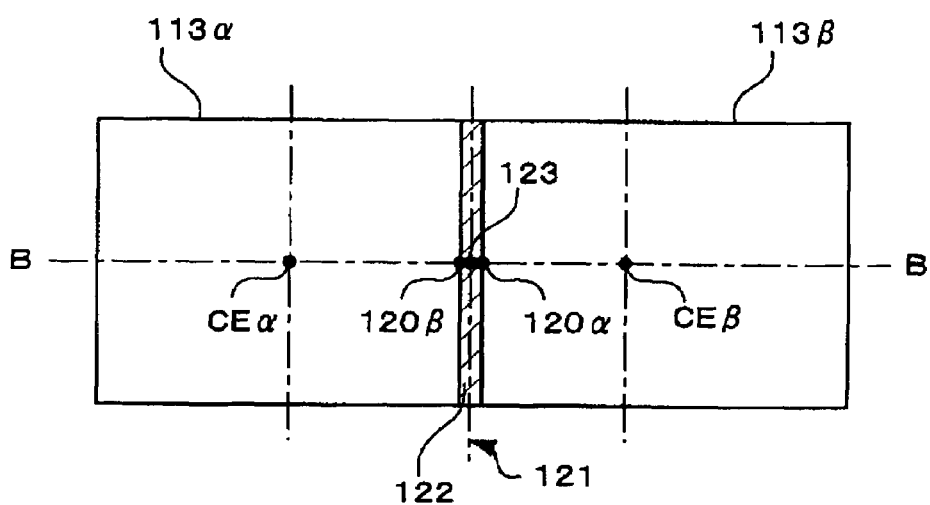
FIG. 18 is an illustration showing image regions of two adjacent cameras shown in FIG. 14, the image regions being disposed next to each other and joined together.

FIG. 18 shows that image regions of images of the two adjacent cameras 111 and 112 are disposed next to each other, and joined together.

Referring to FIG. 18, an image region 113α of the camera 111 and an image region 113β of the camera 112 are overlapped at a shaded area (overlapping region) 122 in the drawing. In the overlapping region 122, images of the same object are picked up by the two cameras 111 and 112.

In the plane X-X connecting the two optical axes CEα and CEβ of the two cameras 111 and 112, a line passing through a midpoint of a line that connects a midpoint of an image edge 120α of the image region 113α of the left camera 111 and a midpoint of an image edge 120β of the image region 113β of the right camera 112 defines a center line 121 of the overlapping region 122.

In this example, as shown in FIG. 14, the NP point is shared by the two cameras 111 and 112, and the NP point substantially coincides with the vertex 105 of the sector-like casing of each camera. Therefore, an area of the overlapping region 122 of the images is extremely small. Due to this, the image edges 120α and 120β (corresponding to edges of the imaging elements 104) in the plane X-X connecting the optical axes of lenses of the two adjacent cameras 111 and 112, and a center portion 123 of the overlapping region (shaded area) 122 are arranged at extremely close intervals, and almost coincide with each other.

Upon the positional relationship, illuminance ratio IL>0 is satisfied, where H is a distance (image height) from the center (optical axis) CE of the imaging element 104 to the center line 121 of the overlapping region 122, and as shown in FIG. 17, an illuminance ratio IL is about 0.4 at the center portion 123 (image height H) in the overlapping region 122, with respect to the F-number corresponding to the open aperture state (F-number 2.0; curve A).

However, when the F-number gradually increases from 2.0 corresponding to the open aperture state and the aperture stop is narrowed, the illuminance ratio at the center portion 123 (image height H) in the overlapping region 122 decreases. When the F-number is 8.0, the illuminance ratio is as low as about 0.1.

Accordingly, the image in the overlapping region 122, namely, joint of the images, would be dark, and the images may not be smoothly joined together.

In this comparative example, a<H is established as shown in FIG. 17, where a is an image height (distance from the optical axis CE) at a position at which the illuminance ratio becomes constant even if the F-number is shifted from the open aperture state to the closed aperture state, although the position is located in a region (region of image height>D) where the illuminance ratio with respect to the maximum illuminance in the scanning direction decreases as the distance from the optical axis CE increases.

The present invention may prevent the joint of the images from becoming dark when the image regions are joined together and the plurality of imagers are used, like the configuration in the above-described comparative example.

In the present invention, in addition to the above-described configuration, a>H is satisfied, where H is a distance from the optical axis to the center portion of the overlapping region in which an image of the imager is overlapped with an image of the adjacent imager when the imaging element is scanned from the optical axis toward an optical axis of the adjacent imager, and a is a distance from the optical axis to a position, at which the illuminance ratio with respect to the maximum illuminance in the scanning direction becomes constant even if the aperture state is shifted from the open aperture state to the closed aperture state, although the position is located in a region in which the illuminance ratio with respect to the maximum illuminance in the scanning direction decreases as the distance from the optical axis increases.

The amount of light received by the imaging element varies over the imaging element by shifting the aperture state of the aperture stop in terms of the F-number. The amount of light increases in the open aperture state, and it decreases as the F-number increases and the aperture stop is narrowed.

However, the amount of light in accordance with the variation in the F-number may not uniformly vary over the imaging element depending on the configuration of the front lens and the lens group of each imager. In particular, as described above, when at least the front lens is cut along the planes not passing through the optical axis, the incident light reaching the outside of the cutting planes is not received by the front lens, and the amount of light at the edges corresponding to the cutting planes of the imaging element decreases. At this time, when the imaging element is scanned from the center (optical axis) of the imaging element toward the optical axis of the adjacent imager, the illuminance ratio with respect to the maximum illuminance in the scanning direction may decrease in the vicinities of the edges of the imaging element. That is, as already shown in FIG. 17, there is found the region (region shown in FIG. 17, image height>D) where the illuminance ratio with respect to the maximum illuminance in the scanning direction decreases as the distance from the optical axis increases.

In this region, as already shown in FIG. 17, the illuminance ratio tends to slowly decrease in the open aperture state while the illuminance ratio starts decreasing at the position relatively close to the optical axis, and the illuminance ratio tends to rapidly decrease in the closed aperture state while the illuminance ratio starts decreasing at the position relatively away from the optical axis. In the region, there is the position at which the illuminance ratio with respect to the maximum illuminance in the scanning direction does not vary even though the aperture state is shifted from the open aperture state to the closed aperture state. The distance (image height) to this position from the optical axis is considered as a. At this position, the illuminance ratio is smaller than that in the vicinity of the optical axis, however, a certain amount of the illuminance ratio may be obtained (0.4 shown in FIG. 17) in any aperture state.

In FIG. 17, since a<H is established, the illuminance ratio in the closed aperture state is considerably small at the center portion 123 (image height H) in the overlapping region 122. Accordingly, joint of the images would be dark, and the images may not be smoothly joined together.

In contrast, since the configuration of the present invention satisfies a>H, the center portion (image height H) of the overlapping region is located at the optical axis side relative to the position of the image height a, and accordingly, the illuminance ratio at the center portion (image height H) of the overlapping region becomes larger than that at the position of the image height a. At the position of the image height a, the illuminance ratio is smaller than that in the vicinity of the optical axis. However, a certain amount of light may be obtained in any aperture state as described above. Accordingly, the illuminance ratio may be sufficiently provided at the center portion (image height H) of the overlapping region more than that provided at the position of the image height a.

Note that the illuminance ratio at the center portion (image height H) of the overlapping region may not be equivalent to that in the vicinity of the optical axis (for instance, 0.9 or more).

This is because the illuminance ratio may be a value close to that in the vicinity of the optical axis if a signal component is amplified after a noise component is eliminated as long as the certain amount of the illuminance ratio is secured. Since the illuminance ratio is small as the example shown in FIG. 17, the signal component may be considerably affected by the noise component, thereby being difficult to be restored by the amplification.

For instance, the illuminance ratio at the center portion (image height H) of the overlapping region may be about 0.5 or more, and more particularly, may be about 0.6 or more in case that the noise component is large.

Meanwhile, the illuminance ratio may not be secured at the position outside the center portion (image height H) of the overlapping region according to the imager. However, the image is also picked up by the adjacent imager, and that position is located inside the center portion (image height H) of the overlapping region according to the adjacent imager, thereby providing the illuminance ratio sufficiently by the adjacent imager.

Therefore, the position of the image height a may be either inside or outside the edge of the imaging element as long as it is located outside the center portion (image height H) of the overlapping region.

When the position of the image height a is located at a position far enough from the optical axis relative to the edge of the actual imaging element, the position of the image height D shown in FIG. 17 becomes outside the edge of the imaging element, and the illuminance ratio may be evenly distributed over the imaging element in any aperture state.

Next, a specific embodiment of the present invention will be described below.

Figure 3:
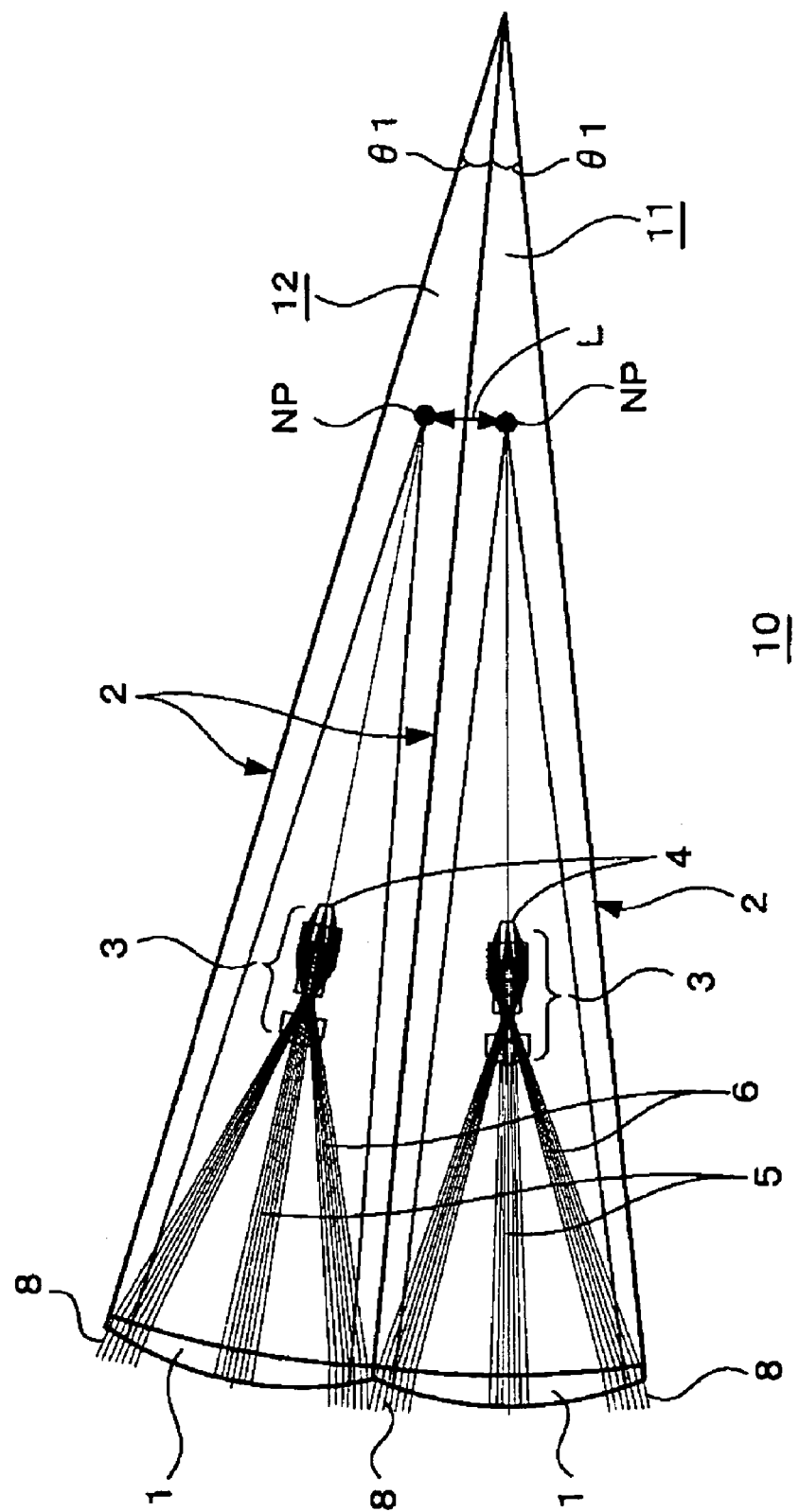
FIG. 3 is a schematic illustration showing a configuration of an imaging device according to an embodiment of the present invention.

FIG. 3 shows a schematic illustration showing a configuration of an imaging device according to an embodiment of the present invention.

An imaging device 10 is formed by joining two imagers (cameras) 11 and 12. The imaging device 10 provides a composite image formed by joining images respectively picked up by the two imagers (cameras) 11 and 12. FIG. 3 is a cross sectional view taken along a plane connecting optical axes of lenses of the two adjacent cameras 11 and 12.

The cameras 11 and 12 each include a front lens 1, a casing 2 having a sector-like cross section with a vertex angle θ1, a lens group 3, and an imaging element 4. Though not shown, an aperture stop equivalent to the aperture stop 309 shown in FIG. 2 is provided in the lens group 3.

FIG. 3 also shows an optical path when the F-number is 2.0, which is a F-number corresponding to the open aperture state.

In the imaging device 10 according to this embodiment, NP points of the two cameras 11 and 12 are located upstream of the vertex of the sector-like casing 2 such that the NP points are located inside the casing 2.

In addition, a distance L between the NP points are determined such that the NP points of the two cameras 11 and 12 are located within a sphere having a radius of 20 mm (within a radius region).

Figure 4:
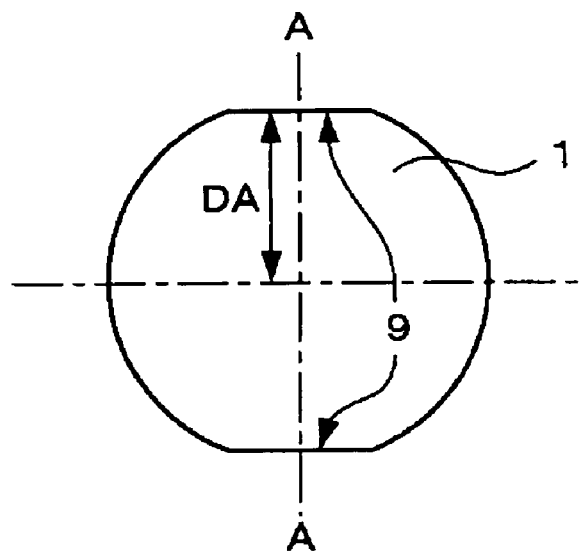
FIG. 4 is a plan view showing a front lens shown in FIG. 3 viewed from an object in an optical axis direction.

FIG. 4 is a plan view showing the front lens 1 shown in FIG. 3 viewed from an object in an optical axis direction. A line A-A shown in FIG. 4 is a plane (cross section shown in FIG. 3) connecting the optical axes of the lenses of the two adjacent cameras 11 and 12.

For allowing the NP points of the cameras 11 and 12 to be located within the sphere having 20 mm radius, a circular lens in each of the cameras 11 and 12 is cut along cutting planes including lines 9 (planes not including the optical axis of the lens) to form the front lens 1 as shown in FIG. 4.

In this embodiment, since a distance DA of the line 9 from the optical axis is larger than a distance DX according to the comparative example (FIG. 15), light beam reaching the outside of the lines 9 will not reach an effective pixel region of the imaging element 4. Therefore, elimination of the rays outside the lines 9 will not affect the illuminance ratio. Due to this, as shown in FIG. 3, the number of rays 6 and 8 reaching edges of the imaging element 4 is substantially the same as that of rays 5 reaching the center of the imaging element 4.

Figure 5:
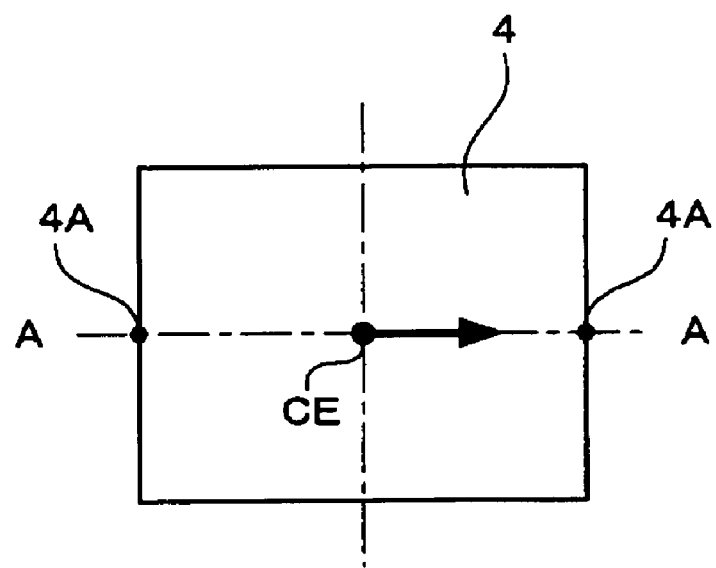
FIG. 5 is a plan view showing an effective pixel region of an imaging element shown in FIG. 3.

FIG. 5 shows a plan view showing an effective pixel region of the imaging element 4. Each of points 4A in FIG. 5 is an intersection point at which the plane A-A connecting the optical axes of the lenses of the adjacent cameras 11 and 12 intersects with an edge of the effective pixel region.

Figure 6:
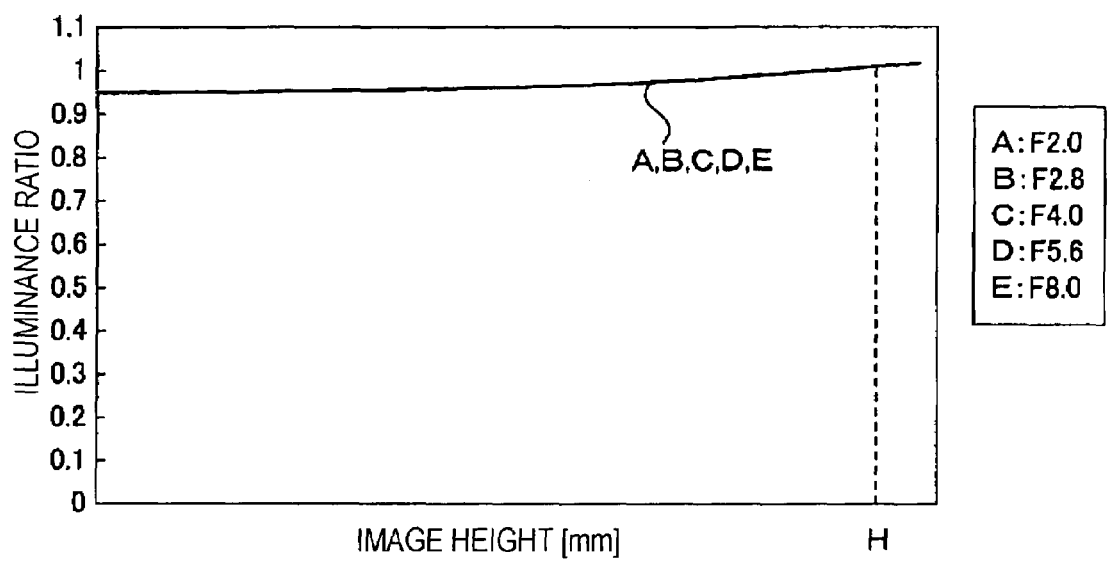
FIG. 6 is an illustration showing variation in illuminance ratios when the imaging element shown in FIG. 5 is scanned in an arrow direction from the center thereof.

FIG. 6 is an illustration showing variation in illuminance ratios when the imaging element 4 shown in FIG. 5 is scanned in an arrow direction from a center CE (disposed on the optical axis of the front lens 1 and the lens group 3) thereof, i.e., in a direction toward an optical axis of the adjacent camera. The horizontal axis of FIG. 6 represents a distance (image height) from the center CE of the imaging element 4, and the vertical axis represents the illuminance ratio when assuming that the maximum illuminance in the scanning direction is 1. Curves A, B, C, D, and E represent variations in the illuminance ratios in accordance with F-numbers, ranged from 2.0 (open aperture state) to 8.0.

As shown in FIG. 6, the illuminance ratio hardly varies even if the F-number increases from 2.0.

Figure 7:
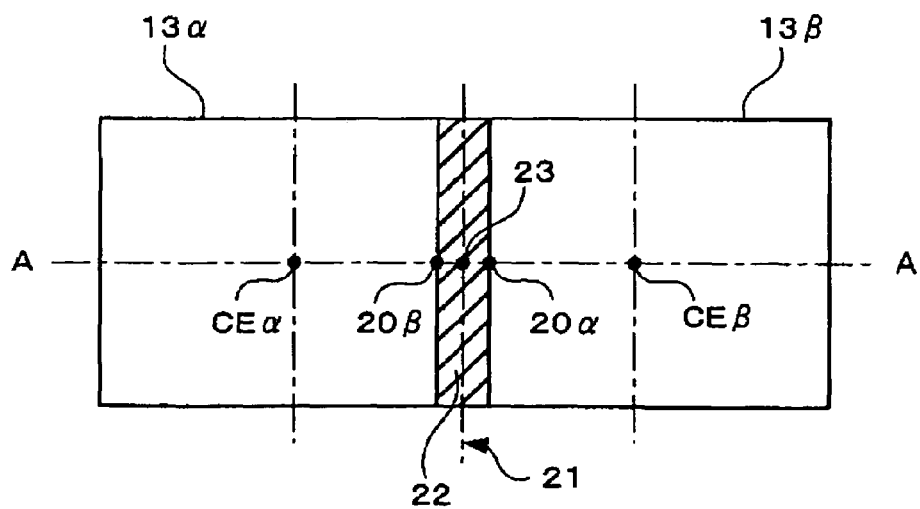
FIG. 7 is an illustration showing image regions of two adjacent cameras shown in FIG. 3, the image regions being disposed next to each other and joined together.

FIG. 7 shows that image regions of images of the two adjacent cameras 11 and 12 are disposed next to each other, and joined together.

Referring to FIG. 7, an image region 13α of the camera 11 and an image region 13β of the camera 12 are overlapped at a shaded area (overlapping region) 22 in the drawing. In the overlapping region 22, images of the same object are picked up by the two cameras 11 and 12.

In the plane A-A connecting the two optical axes CEα and CEβ of the two cameras 11 and 12, a line passing through a midpoint of a line that connects a midpoint of an image edge 20α of the image region 13α of the left camera 11 and a midpoint of an image edge 20β of the image region 13β of the right camera 12 defines a center line 21 of the overlapping region 22.

In this embodiment, as shown in FIG. 3, the NP points of the two cameras 11 and 12 are present within the sphere having the 20 mm radius, but they do not coincide with each other. The NP points are present inside the casings 2, respectively, so that an area of the overlapping region 22 becomes relatively large. Due to this, the image edges 20α and 20β (corresponding to edges of the imaging elements 4) in the plane A-A connecting the optical axes of lenses of the two adjacent cameras 11 and 12, and a center portion 23 of the overlapping region (shaded area) 22 are arranged at certain intervals.

Upon the positional relationship, the illuminance ratio IL at the center portion 23 (image height H) of the overlapping region 22 satisfies IL>0, as shown in FIG. 6.

In addition, as shown in FIG. 6, even if the F-number gradually increases from 2.0 corresponding to the open aperture state, the illuminance ratio hardly varies over the imaging element from its optical axis to its edge.

In particular, when the image height, at which the illuminance ratio is constant (namely, at which curved lines A, B, C, D, and E intersect with each other), is considered as a, the position of the image height a is far enough from the optical axis relative to the edge of the actual imaging element, and the illuminance ratio is evenly distributed over the imaging element in any aperture state, thereby satisfying H<a.

Therefore in this embodiment, in any aperture state, the sufficient amount of light is provided at the joint of the images, and the images may be joined together such that no irregularity appears at the joint of the images.

With the configuration of the imaging device 10 according to the above-described embodiment, a>H is satisfied, where H is a distance (image height) from the optical axis CE to the center portion 23 of the overlapping region 22, in which the image is overlapped with that of the adjacent imager when the imaging element 4 is scanned from the center (optical axis) CE of the imaging element 4 toward the optical axis of the adjacent camera, and a is a distance (image height) from the optical axis CE to the position at which the illuminance ratio with respect to the maximum illuminance in the scanning direction does not vary even if the F-number is shifted from the open aperture state to the closed aperture state, although the position is located in the region in which the illuminance ratio with respect to the maximum illuminance in the scanning direction decreases as the distance from the optical axis CE increases. Therefore, a sufficient amount of light can be provided in any aperture state in the range of from the center (optical axis) CE is the imaging element 4 to the center portion 23 of the overlapping region 22.

Accordingly, when the images picked up by the imaging elements 4 of the two adjacent cameras 11 and 12 are joined together, the sufficient amount of light may be provided even at the joint of the images, namely, at the overlapping region 22, thereby preventing insufficiency in the amount of light, and providing the images without irregularity at the joint of the images. Therefore, images with high image quality may be provided in any aperture state.

In addition, according to this embodiment, since the NP points of the two cameras 11 and 12 are located within the predetermined radius region centered on one NP point, the parallax between the images of the cameras 11 and 12 is restrained, and thus, almost no parallax is generated.

The front lens 1 is cut along the planes not including the optical axis. Accordingly, the two cameras 11 and 12 may be joined together at the cutting planes, thereby easily allowing the NP points to be collectively located within the predetermined radius region while the two cameras 11 and 12 are joined together.

Further, according to this embodiment, since the illuminance ratio is evenly distributed over the imaging element 4 in any aperture state, the sufficient amount of light may be provided at the joint of the images in any F-number.

Therefore, the two cameras 11 and 12 may pick up images with high image quality over a wide range without causing the parallax.

In addition, since the image regions are respectively assigned to the two cameras 11 and 12, images can be picked up with high resolution over the wide range by picking up images with the cameras 11 and 12 offering high resolution.

Figure 8:
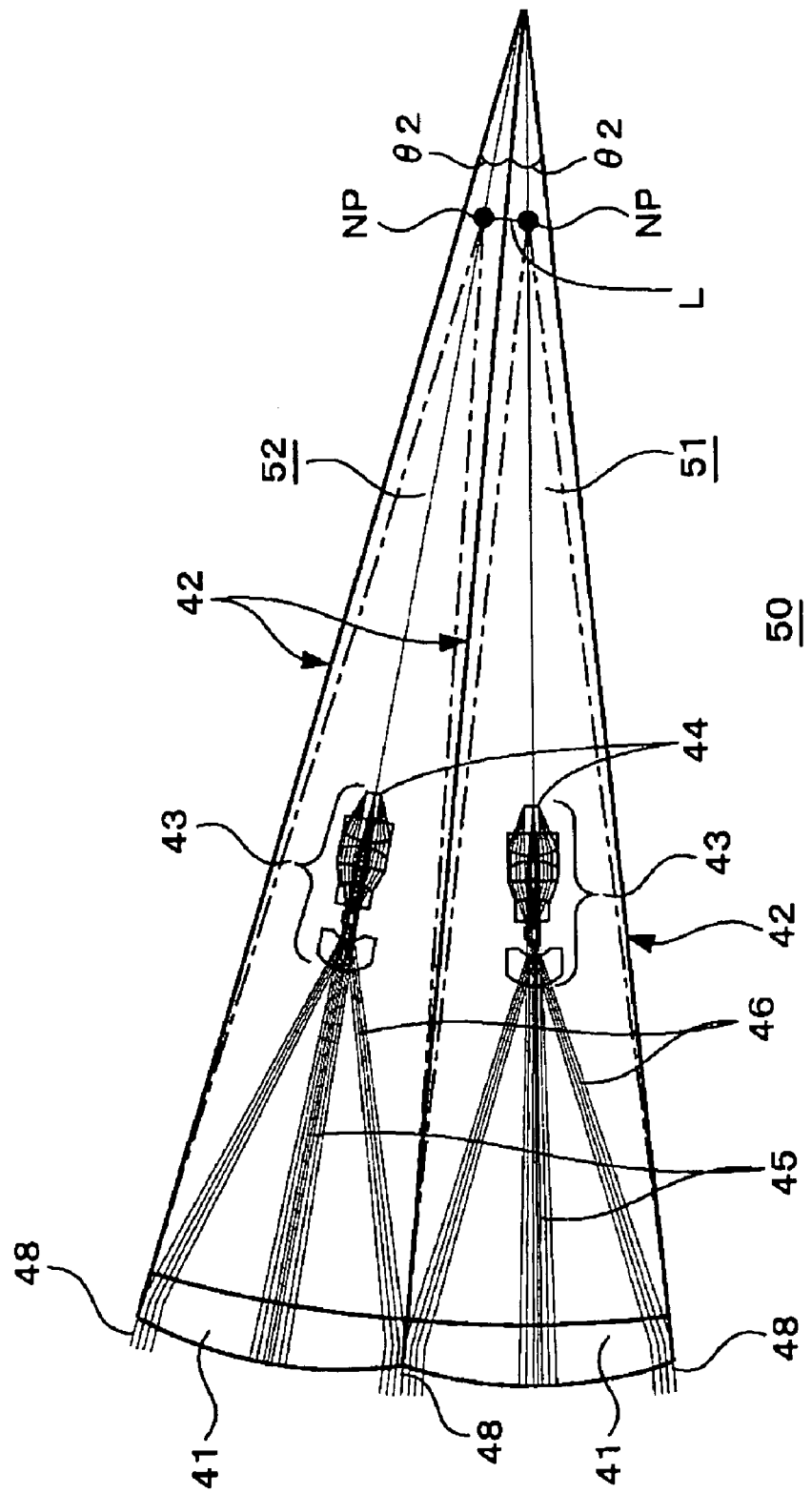
FIG. 8 is a schematic illustration showing a configuration of an imaging device according to another embodiment of the present invention.

Next, FIG. 8 shows a schematic illustration showing a configuration of an imaging device according to another embodiment of the present invention.

An imaging device 50 is formed by joining two imagers (cameras) 51 and 52. The imaging device 10 provides a composite image formed by joining images respectively picked up by the two imagers (cameras) 51 and 52. FIG. 8 is a cross sectional view taken along a plane connecting optical axes of lenses of the two adjacent cameras 51 and 52.

The cameras 51 and 52 each include a front lens 41, a casing 42 having a sector-like cross section with a vertex angle θ2, a lens group 43, and an imaging element 44. Though not shown, an aperture stop equivalent to the aperture stop 309 shown in FIG. 2 is provided in the lens group 43.

FIG. 8 also shows an optical path when the F-number is 2.0, which is a F-number corresponding to the open aperture state.

In the imaging device 50 according to this embodiment, similarly to the imaging device 10 according to the previous embodiment, NP points of the two cameras 51 and 52 are located upstream of the vertex of the sector-like casing 42 such that the NP points are present inside the casing 42.

In addition, a distance L between the NP points are determined such that the NP points of the two cameras 51 and 52 are located within a sphere having a radius of 20 mm (within a radius region).

Note that the positions of the NP points are located downstream portion and are close to the vertex of the sector-like casing 42 as compared with the NP points of the imaging device 10 according to the previous embodiment.

Figure 9:
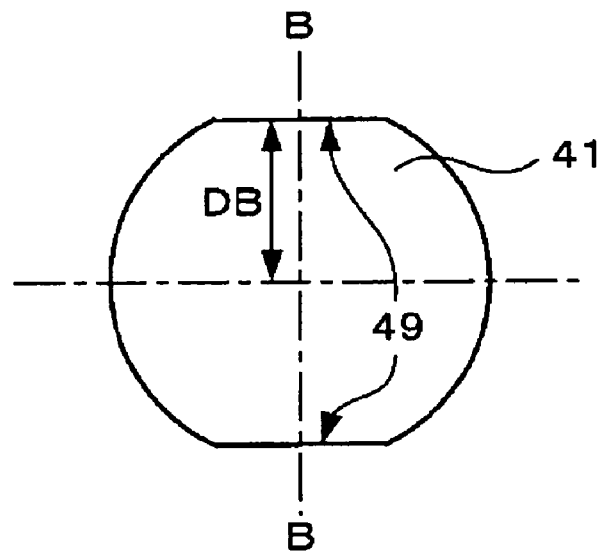
FIG. 9 is a plan view showing a front lens shown in FIG. 8 viewed from an object in an optical axis direction.

FIG. 9 is a plan view showing the front lens 41 shown in FIG. 8 viewed from an object in an optical axis direction. A line B-B shown in FIG. 9 is a plane (cross section shown in FIG. 8) connecting the optical axes of the lenses of the two adjacent cameras 51 and 52.

For allowing the NP points of the cameras 51 and 52 to be located within the sphere having 20 mm radius, a circular lens in each of the cameras 51 and 52 is cut along cutting planes including lines 49 (planes not including the optical axis of the lens) to form the front lens 41 as shown in FIG. 9.

In this embodiment, a distance DB from the optical axis of the line 49 is greater than the distance DX of the comparative example (FIG. 15), and smaller than the distance DA (FIG. 4) of the previous embodiment (FIG. 4). In particular, the relationship is expressed as DX<DB<DA.

In addition, rays reaching the outside of the lines 49 are not received by the front lens 41, and the number of rays 46 and 48 reaching edges of the imaging element 44 becomes smaller than that of rays 45 reaching the center of the imaging element 44.

Figure 10:
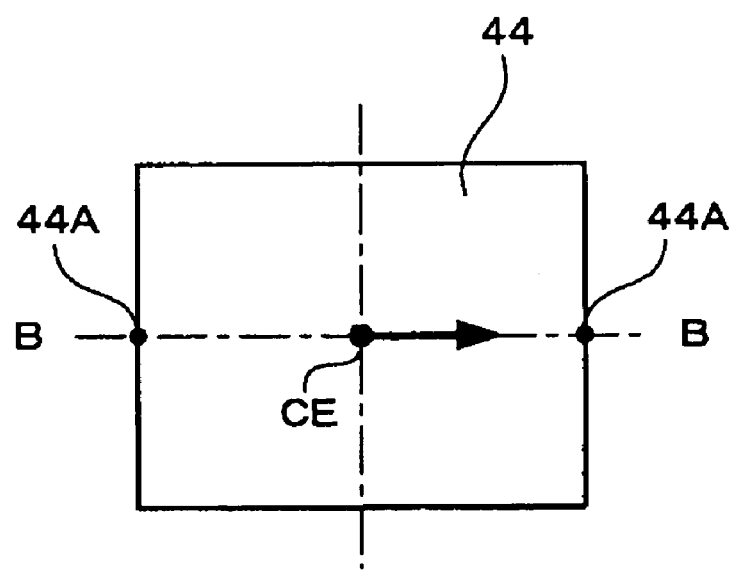
FIG. 10 is a plan view showing an effective pixel region of an imaging element shown in FIG. 8.

FIG. 10 shows a plan view showing an effective pixel region of the imaging element 44. Each of points 44A in FIG. 10 is an intersection point at which the plane B-B connecting the optical axes of the lenses of the adjacent cameras 51 and 52 intersects with an edge of the effective pixel region.

Figure 11:
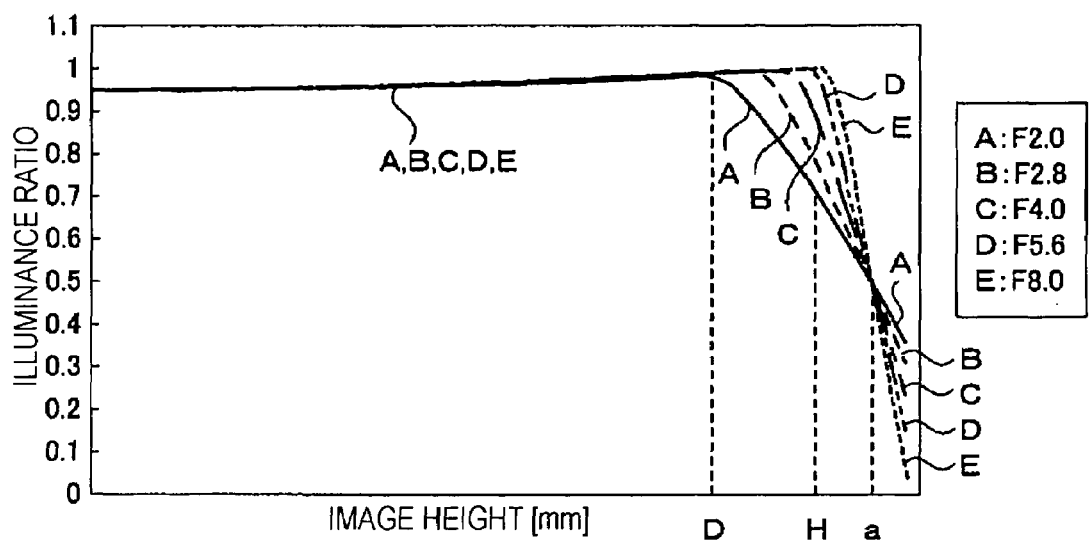
FIG. 11 is an illustration showing variation in illuminance ratios when the imaging element shown in FIG. 10 is scanned in an arrow direction from the center thereof.

FIG. 11 is an illustration showing variation in illuminance ratios when the imaging element 44 shown in FIG. 10 is scanned in an arrow direction from a center CE (disposed on the optical axis of the front lens 41 and the lens group 43) thereof, i.e., in a direction toward an optical axis of the adjacent camera. The horizontal axis of FIG. 11 represents a distance (image height) from the center CE of the imaging element 44, and the vertical axis represents the illuminance ratio when assuming that the maximum illuminance in the scanning direction is 1. Curves A, B, C, D, and E represent variations in the illuminance ratios in accordance with F-numbers, ranged from 2.0 (open aperture state) to 8.0.

As shown in FIG. 11, since the rays reaching the outside of the lines 49 are not received by the front lens 41, the illuminance ratio decreases and becomes about 0.7 at the image height H, when the F-number is 2.0 (curve A) in a region in which the image height (distance from the center CE) is D or more.

Figure 12:
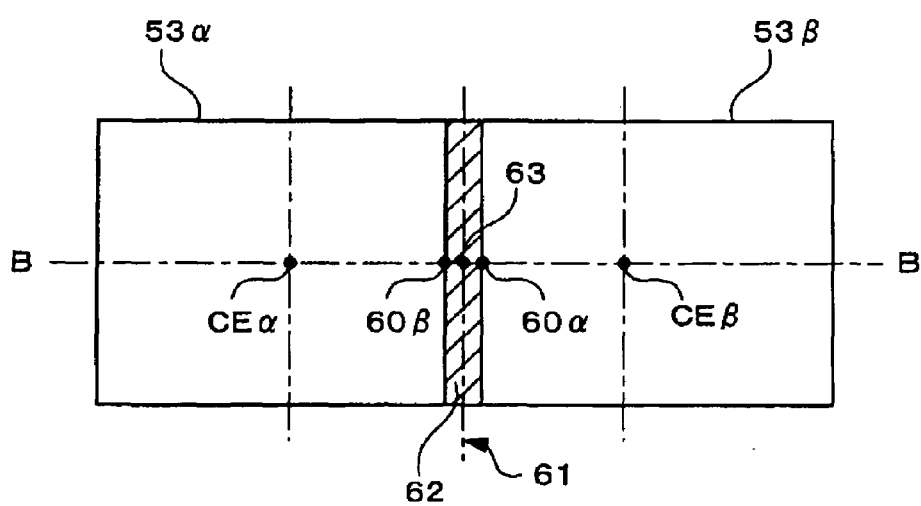
FIG. 12 is an illustration showing image regions of two adjacent cameras shown in FIG. 8, the image regions being disposed next to each other and joined together.

FIG. 12 shows that image regions of images of the two adjacent cameras 51 and 52 are disposed next to each other, and joined together.

Referring to FIG. 12, an image region 53α of the camera 51 and an image region 53β of the camera 52 are overlapped at a shaded area (overlapping region) 62 in the drawing.

In the plane B-B connecting the two optical axes CEα and CEβ of the two cameras 51 and 52, a line passing through a midpoint of a line that connects a midpoint of an image edge 60α of the image region 53α of the left camera 51 and a midpoint of an image edge 60β of the image region 53β of the right camera 52 defines a center line 61 of the overlapping region 62.

In this embodiment, as shown in FIG. 8, the NP points of the two cameras 51 and 52 are present within the sphere having the 20 mm radius, but they do not coincide with each other. The NP points are present inside the casings 42, respectively, so that the overlapping region 62 is generated. The area of the overlapping region 62 is larger than that of the comparative example (FIG. 18) and smaller than that of the previous embodiment (FIG. 7).

The illuminance ratio IL at a center portion 63 (image height H) of the overlapping region 62 satisfies IL>0, as shown in FIG. 11.

As shown in FIG. 11, a>H (distance from the lens optical axis CE to the center line 61 of the overlapping region 62) is established, where a is the image height at which the illuminance ratio is constant while the F-number of the lens gradually increases from 2.0. Therefore, the illuminance ratio of the center portion 63 (image height H) of the overlapping region 62 increases from the minimum value (about 0.7 as shown in FIG. 11) of the illuminance ratio with the F-number being 2.0

(open aperture state), as the F-number increases. That is, the sufficient illuminance ratio may be provided at the center portion 63 of the overlapping region 62.

Therefore, even when the F-number increases, the images are smoothly joined together without lacking a part of the composite image.

According to this embodiment, the illuminance ratio decreases in the region of image height>H as shown in FIG. 11, however, the image regions of the adjacent cameras are overlapped to each other in the region of image height>H as shown in FIG. 12, and the adjacent camera is in the region of image height<H, thereby providing the sufficient amount of light by the adjacent camera.

Accordingly, the images may be joined together without irregularity by performing a predetermined processing of adding the image signals of the two cameras 51 and 52.

Regarding the noise and the like, the illuminance ratio with image height=H is preferably about 0.6 or more.

With the configuration of the imaging device 50 according to the above-described embodiment, a>H is satisfied, where H is a distance (image height) from the optical axis CE to the center portion 63 of the overlapping region 62, in which the image is overlapped with that of the adjacent camera when the imaging element 44 is scanned from the center (optical axis) CE of the imaging element 44 toward the optical axis of the adjacent camera, and a is a distance (image height) from the optical axis CE to the position at which the illuminance ratio with respect to the maximum illuminance in the scanning direction does not vary even if the F-number is shifted from the open aperture state to the closed aperture state, although the position is located in the region (region of image height>D) in which the illuminance ratio with respect to the maximum illuminance in the scanning direction decreases as the distance from the optical axis CE increases. Therefore, a sufficient amount of light can be provided in any aperture state in the range of from the center (optical axis) CE is the imaging element 44 to the center portion 63 of the overlapping region 62.

Accordingly, when the images picked up by the imaging elements of the two adjacent cameras 51 and 52 are joined together, the sufficient amount of light may be provided even at the joint of the images, namely, at the overlapping region 62, thereby preventing insufficiency in the amount of light, and providing the images without irregularity at the joint of the images. Therefore, images with high image quality may be provided in any aperture state.

In addition, according to this embodiment, since the NP points of the two cameras 51 and 52 are collectively located within the predetermined radius region centered on the one NP point, the parallax between the images of the cameras 51 and 52 is restrained, and thus, almost no parallax is generated.

The front lens 1 is cut along the planes not including the optical axis. Accordingly, the two cameras 51 and 52 may be joined together at the cutting planes, thereby easily placing the NP points within the predetermined radius region while the two cameras 51 and 52 are joined together.

Therefore, the two cameras 51 and 52 may pick up images with high image quality over the wide range without causing the parallax.

In addition, since the image regions are respectively assigned to the two cameras 51 and 52, images can be picked up with high resolution over the wide range by picking up the images by the cameras 51 and 52 offering high resolution.

As evidenced by comparing the comparative example with the above-described two embodiments, the distance (image height) a from the optical axis CE at the position, at which the illuminance ratio with respect to the maximum illuminance in the scanning direction does not vary even though the F-number is shifted from the open aperture state to the closed aperture state, may vary by changing the positions of the cutting planes (line portions in each plan view) of the front lens, and the cutting amount of the lens.

That is, the control of the cutting amount of the front lens may control the degree of the distance a.

In the imaging device according to the embodiments of the present invention, the range for picking up images is not limited particularly, and may be changed by assembling a plurality of imagers.

In the above-described embodiments, the two cameras are joined together to form the imaging device 10, 50. However, three or more cameras may be joined to form an imaging device in the present invention.

In the above-described embodiments, the imagers are joined in a horizontal direction and pick up images over a horizontally long, band region (to 360 degrees). However, imagers may be joined vertically in addition to being joined horizontally, so that image regions are further overlapped to pick up images over a further wide range.

The image regions may cover a part of the all sky, for instance, a hemispherical region in a forward direction, or may form a polyhedron to pick up images over nearly all sky.

When the image regions are overlapped by vertically joining the imagers, the imagers are disposed next to each other in a direction in addition to the horizontal direction. Therefore, the configuration preferably satisfies a>H in the scanning direction along a plane connecting the optical axes of the lenses of the imagers adjacent to each other in that direction.

Now, other embodiments of front lenses of imagers are shown in FIGS. 13A to 13D. These embodiments are employed when the imagers are vertically joined and the image regions are overlapped.

Figure 13A:
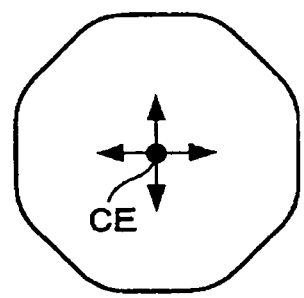
FIGS. 13A to 13D are illustrations showing cross sections of front lenses of imagers according to other embodiments.
Figure 13B:
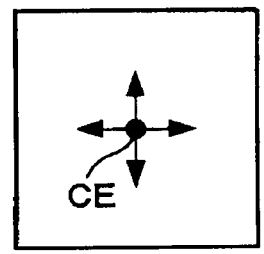

FIGS. 13A and 13B each show an embodiment of a front lens when the imagers are disposed next to each other in vertical and horizontal directions. As indicated by arrows in each drawing, the scanning directions are the vertical and horizontal directions, and a>H is satisfied in any scanning direction.

FIG. 13A is a case where the cutting plane of the front lens is away from the optical axis CE, and curvatures are remained.

FIG. 13B is a case where the cutting plane of the front lens is closer to the optical axis CE than that of the case shown in FIG. 13A, so that the front lens become a square. In this case, the area of the overlapping region of the images becomes larger than that of the case shown in FIG. 13A.

Figure 13C:
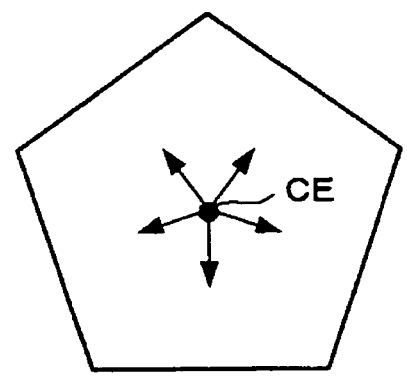
Figure 13D:
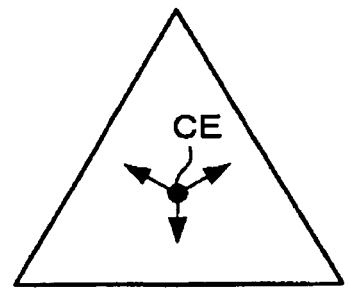

FIGS. 13C and 13D each are an embodiment of a front lens when the imagers are disposed next to each other not only vertically, but also in three-dimensionally to be a polyhedron. The front lens shown in FIG. 13C is a regular pentagon corresponding to a regular dodecahedron. The front lens shown in FIG. 13D is a regular triangle corresponding to a regular icosahedron.

In these embodiments, the scanning directions are the directions indicated by arrows in each drawing, and a>H is preferably satisfied in any scanning direction.

Note that lenses other than the lens (front lens) disposed closest to the object may not be cut, or may be cut.

It should be understood that the present invention is not limited to the above-described embodiments, and various configurations may occur within the scope of the appended claims or the equivalents thereof.

What is claimed is:

1. An imaging device comprising:

a plurality of imaging means each of which picks up an image of each of a plurality of sub-objects obtained by dividing an object in a wide range; and processing means for joining the images to form a composite image in accordance with image information output from the imaging means and input to the processing means, wherein each imaging means includes at least one lens having an aperture stop, and an imaging element for sensing a ray passing through the at least one lens, when a chief ray located in a Gauss region is selected from chief rays passing through the center of the aperture stop of the at least one lens of each imaging means, and a point at which an optical axis of the at least one lens of each imaging means intersects with an extended line component of the selected chief ray located in an object space is defied as a NP point, in terms of each imaging means, the NP point is located downstream of the imaging element of each imaging means, and in terms of the plurality of imaging means, the NP points are collectively located within a predetermined radius region centered on one of the NP points, in each imaging means, a lens which is included in the at least one lens and disposed closest to the object is cut along a plane not including the optical axis of each imaging means, and a>H is satisfied, where H is a distance from the optical axis of one of the plurality of imaging means to a center portion of an overlapping region, in which the image of the one imaging means is overlapped with that of the adjacent imaging means when the imaging element of the one imaging means is scanned from the optical axis toward the optical axis of the adjacent imaging means, and a is a distance from the optical axis of the one imaging means to a position at which an illuminance ratio with respect to a maximum illuminance in the scanning direction does not vary even if the aperture stop is shifted from an open aperture state to a closed aperture state, although the position is located in a region in which the illuminance ratio with respect to the maximum illuminance in the scanning direction decreases as the distance from the optical axis of the one imaging means increases.

2. The imaging device according to claim 1, wherein the predetermined radius region is a region having a radius of about 20 mm or less centered on the one of the NP points.

3. The imaging device according to claim 1, wherein IL>0 is satisfied, where IL is an illuminance ratio at the center portion of the overlapping region in which the image is overlapped with that of the adjacent imaging means, with respect to the maximum illuminance in the scanning direction, in the open aperture state.

4. The imaging device according to claim 1, wherein the illuminance ratio with respect to the maximum illuminance in the scanning direction does not vary over a range of from the optical axis of the one imaging means to an edge of the imaging element even if the aperture stop is shifted from the open aperture state to the closed aperture state while the imaging element is scanned from the optical axis of the one imaging means toward the optical axis of the adjacent imaging means.

5. An imaging device comprising:

a plurality of imagers each of which picks up an image of each of a plurality of sub-objects obtained by dividing an object in a wide range; and a processing unit for joining the images to form a composite image in accordance with image information output from the imagers and input to the processing unit, wherein each imager includes at least one lens having an aperture stop, and an imaging element for sensing a ray passing through the at least one lens, when a chief ray located in a Gauss region is selected from chief rays passing through the center of the aperture stop of the at least one lens of each imager, and a point at which an optical axis of the at least one lens of each imager intersects with an extended line component of the selected chief ray located in an object space is defied as a NP point, in terms of each imager, the NP point is located downstream of the imaging element of each imager, and in terms of the plurality of imagers, the NP points are collectively located within a predetermined radius region centered on one of the NP points, in each imager, a lens which is included in the at least one lens and disposed closest to the object is cut along a plane not including the optical axis of each imager, and a>H is satisfied, where H is a distance from the optical axis of one of the plurality of imagers to a center portion of an overlapping region, in which the image of the one imager is overlapped with that of the adjacent imager when the imaging element of the one imager is scanned from the optical axis toward the optical axis of the adjacent imager, and a is a distance from the optical axis of the one imager to a position at which an illuminance ratio with respect to a maximum illuminance in the scanning direction does not vary even if the aperture stop is shifted from an open aperture state to a closed aperture state, although the position is located in a region in which the illuminance ratio with respect to the maximum illuminance in the scanning direction decreases as the distance from the optical axis of the one imager increases.

* * * * *